United States Patent [19]

Oerder

[11] Patent Number: 5,634,083
[45] Date of Patent: May 27, 1997

[54] METHOD OF AND DEVICE FOR DETERMINING WORDS IN A SPEECH SIGNAL

[75] Inventor: Martin Oerder, Herzogenrath, Germany

[73] Assignee: U.S. Philips Corporation, New York, N.Y.

[21] Appl. No.: 203,105

[22] Filed: Feb. 28, 1994

[30] Foreign Application Priority Data

Mar. 3, 1993 [DE] Germany .................. 43 04 508.2

[51] Int. Cl.$^6$ ............... G10L 9/00; G10L 5/00
[52] U.S. Cl. ................................... 395/2.62
[58] Field of Search ............. 381/41–45; 395/2, 395/2.6–2.64

[56] References Cited

U.S. PATENT DOCUMENTS

| 4,624,008 | 11/1986 | Vensko et al. | 381/43 |
| 4,947,438 | 8/1990 | Paeseler | 381/43 |
| 5,228,110 | 7/1993 | Steinbiss | 395/2 |
| 5,305,422 | 4/1994 | Junqua | 395/2.62 |

FOREIGN PATENT DOCUMENTS

| 41306333 | of 0000 | Germany . |
| 41306317 | of 0000 | Germany . |

OTHER PUBLICATIONS

Philips Telecommunication Review, vol. 51, No. 2, English Edition, pp. 4–17.

*Primary Examiner*—Allen R. MacDonald
*Assistant Examiner*—Patrick N. Edouard
*Attorney, Agent, or Firm*—Debra K. Stephens

[57] ABSTRACT

The procedure for the recognition of a speech signal until output of the recognized word sequence or the recognized sentence is split in accordance with the invention in such a manner that first only word hypotheses are separately generated for different starting instants and that from these word hypotheses preliminary word strings are formed in conformity with a word graph, the word graph thus arising being continuously optimized by erasure of parts of word strings. Parts of word strings having the same beginning and end points are compared with one another and the scores of words having concurrent end points are compared with a threshold value. Further steps for optimization of the word graph are also shown. For output disclosed a particularly effective post-editing operation where for each incorrect word all further words having the same beginning are output, enabling fast selection of the correct word from all said further words, by the operator.

14 Claims, 3 Drawing Sheets

METHOD OF AND DEVICE FOR DETERMINING WORDS IN A SPEECH SIGNAL

BACKGROUND OF THE INVENTION

The invention relates to a method of determining a sequence of words of a predetermined vocabulary in a speech signal, comprising the steps of: sampling the speech signal at recurrent instants so as to produce a sequence of test signals;

Signal-wise comparing the test signals with different sequences of reference signals while generating scores, each sequence of reference signals representing a word of the vocabulary, the comparison always commencing anew with subsequent test signals, starting from the beginning of the different sequences of reference signals; deriving, for each word end reached, a word result which comprises at least a reference to the word beginning of the ended word, a word score, and a reference to the ended word; deriving at least one sequence of words from the word results. The invention also relates to a device for carrying out the method.

A method of this kind is known from EP 0 285 211 A2. Therein, branched word strings are formed, the number of branches being limited, notably in the case of a large vocabulary and long sentences, in that the scores are regularly compared with a threshold value and sequences in which the score exceeds the threshold value are not continued. The number of branches are reduced further by using a language model for the comparison, i.e. for the decision as to with which sequences comparisons are to be continued after ended words. The comparisons, always commencing anew, are not carried out in a mutually independent fashion, but represent, like the comparisons within the sequences of reference signals, parts of sentence hypotheses which can also be recombined so that from comparisons commenced at different, usually closely spaced instants or test signals, only one remains so as to lead to the word end. From the branches remaining at the end of the speech signal, the branch having the best score at the end is traced back, and the words of this branch are output from the beginning.

Notably for taking into account the language model this method requires a major processing effort and the use of the threshold value and the language model may be a cause of failure in determining the actually spoken word sequence from the speech signal because of premature and undue termination of the relevant branch.

From U.S. Pat. No. 4,624,008 there is known a speech recognition device which utilizes a language model in the form of a strictly predetermined syntaxis. For each word end it is checked whether the ended word is compatible with the preceding words in conformity with the syntaxis, and subsequently it is determined which words may succeed, the comparison being continued only with these words. Furthermore, it is continuously checked whether a sentence end in conformity with the predetermined syntaxis has been reached. Thus, continuous use is again made of a language model in order to limit the number of hypotheses arising during the comparisons.

SUMMARY OF THE INVENTION

It is an object of the invention to provide a method of the kind set forth in which the search effort remains comparatively small and in which nevertheless, the risk of losing the correct sequence of words during the progressing comparisons still remains small.

This object is achieved in accordance with the invention in that each comparison commencing anew with the beginning of sequences of reference signals is separately carded out as far as the word end, independently of any other comparison, that preliminary word strings are formed, so as to be stored, by means of the word results of the word ends by joining each word which ends at an instantaneous test signal to each preliminary word string which ends directly preceding the beginning of the relevant word ending at said instantaneous test signal in order to form a new preliminary word string, the word score of each word being combined with the score reached at the end of the preliminary word string so as to form a new score, the most favourable new score being used as the initial score for the comparison newly started immediately thereafter, beginning with the different sequences of reference signals, and that the words of at least one word string are output successively from the beginning.

The overall recognition procedure is thus split into two phases, the first phase providing word results which are acquired in an independent manner and wherefrom sentence hypotheses are formed during the second phase. Figuratively speaking, this method can be considered as a first phase during which word hypotheses are produced which are combined so as to form a word graph, a word graph being a functional graph with a starting node and an end node and whose edges represent words. Any path through the graph from the starting node to the end node represents a feasible sentence. Each node in the graph is associated with an instant of the speech signal, that is to my with a given test signal, and each edge in the graph is associated with an score, preferably a logarithmic representation of the probability that the relevant word or part of a word has generated the associated segment of the speech signal. The steps in accordance with the invention thus correspond to the formation of a word graph, and ultimately the words of at least one word string are successively output from the beginning. Generally speaking, this will be the word string having the most favourable score at the end; however, the words of several word strings can also be output in the order of increasingly less favourable score. This is because practically always several word strings, and above all branches of word strings, are retained.

Advantageously, that for each new preliminary word string it is checked whether at least a part of this word string is identical, in respect of word order, to a part of another preliminary word string, the parts having started and ended at the same test signal, all words ended last of identical parts being erased with the exception of the last word ended of the preliminary word string with the most favourable score, that the joined word of all new preliminary word strings whose score is less favourable than the best score of all preliminary word strings preliminarily ending at the instantaneous test signal by more than a predetermined threshold value is erased.

Selection of the predetermined threshold value enables determination of how many edges of the word graphs are formed during the processing of the speech signal, i.e. to what extent the word graph is split up. An excessively small threshold value could cause premature and undue termination, in extreme circumstances, of the path through the word graph actually corresponding to the sentence spoken, whereas an excessively large threshold value leads to excessive growth of the word graph. In this respect it is to be noted that during the preceding execution of the comparisons of test signals with reference signals a threshold value is also used in known manner to limit the number of word hypotheses generated, and that this threshold value for the comparisons may differ from the threshold value for the optimization of the word graph.

It is also to be noted that the various sequences of reference signals, each time representing a word of the vocabulary, may comprise common parts, that is to say when the sequences of reference signals for the vocabulary are composed in the form of a tree, for example as described in German Patent Application P 41 30 631.7 (PHD 91–138). This comparison, and hence the formation of the word hypotheses, can be realised with less calculation effort, i.e. substantially faster. A further acceleration can be achieved by executing a preliminary evaluation as described in German Patent Application P 41 30 633.3 (PHD 91–136). However, this is independent of the further processing of the word hypotheses, i.e. the optimization of the word graph by the steps in accordance with the invention.

The formation and optimization of the word graph is in principle also possible without using a language model. However, it is then more difficult to find a threshold value which on the one hand effectively reduces the search effort and on the other hand does not lead to the loss of the optimum or correct sentence hypothesis at the end. Therefore, a version of the invention is characterized in that for the comparison with the threshold value use is made of a further score which is formed by a combination of the new score and a language model score which is selected, in conformity with the combination of the relevant ended word and at least the last word of the preliminary word string whereto the relevant ended word is added, from a first set of predetermined language model scores. As a result, for the second score the fact is taken into account that this value becomes less attractive as the sequence of the, for example last two or last three words is less probable according to the language model. For the language model a bigram or trigram language model can be attractively used. For the further score, apart from the language model score, use is preferably not made of the last new score, determined without utilizing the language model is used, but of the preceding further score where the language model has already been taken into account for the preceding partial word sequence. For each preliminary word string two scores must then be taken along, that is to say one value which is used for the new score and, at later stage upon output, for determining the optimum word sequence, if desired also while taking into account a more complex language model, and a further score which is used for the comparison with the threshold value.

The formation of the word hypotheses by comparison of the test signals with the sequences of reference signals often produces results in the form of short words which correspond to parts of an actually spoken word. In order to eliminate such short words as soon as possible again during the subsequent optimization of the graph, in a further version of the invention for each newly started comparison the most favourable score at the end of the preceding word string is combined with a correction value. The correction value, being used for all words, i.e. also for long words, ensures that a preliminary word chain with a sequence of short words obtains, at the end, an score which is less attractive than that of a preliminary word string which, starting from the same instant as the sub-string with shorter words, is continued, for example with a single long word. As a result, the preliminary word string with the many short words will more readily exceed the threshold value so that it is terminated.

According to the method in accordance with the invention, practically any preliminary word string is continuously split further, so that the word graph ultimately comprises a very large number of sides and nodes, many nodes being associated with the same instants, i.e. with the same test signals. This represents a complex structure requiring a large amount of storage space. Therefore, a further version of the invention is characterized in that words ending at the same test signal constitute a common end of preliminary word strings, and that the ending words arising from the comparison newly started immediately after said common end are joined to said common end. A substantially simpler representation of the word graph is obtained notably when all word strings ending or having a word boundary at the same test signal are put together. Such putting together of points within preliminary word strings can be realised notably retroactively, i.e. when it has been determined that none of the comparisons started directly after the relevant instant or the relevant test signal is still active. When putting together simultaneous ends or nodes of word strings produces parts which comprise, notably over several words, the same word orders and the same beginning and end points, all such parts can be erased, except for the part having the best score. When simultaneous ends of preliminary word strings, representing isochronous nodes in the word graph, are put together, a word graph arises which comprises several parallel paths between two nodes which correspond to different words between these two nodes or, when said parallel paths extend via several nodes, to different intermediate word sequences consisting of several words. The continuation after the joining of such parallel intermediate words, or intermediate word sequences, however, in accordance with the method described thus far is performed with the most favourable score of these intermediate words or intermediate word sequences. When at a later instant the continuations of the word strings or the word graph from this joint are fixed, i.e. no further new continuations can occur because the comparison with all sequences commencing immediately after the joint has definitely been terminated, at such a later instant the score at the end of a preliminary word string, extending via this joint, can still be below the threshold value, but the path via another one of the intermediate words or another one of the intermediate word sequences, resulting in a higher score at the joint, would exceed the threshold value at the later instant. When this is the case, the word graph can be retroactively simplified again so as to accelerate the further processing. In a version of the method in accordance with the invention, therefore, for word strings in which several intermediate words or intermediate word sequences have started at the same test signal and have ended at the same other test signal and where the comparison newly started after said other test signal is not continued further with at least one sequence of reference signals, for each of these intermediate words or intermediate word sequences at least the word scores up to the word ended last are combined to form an intermediate score, the intermediate word or the intermediate word sequence being erased when the intermediate score exceeds the threshold value. Thus, a word graph is formed in which the scores of each of the feasible paths are within the threshold value. For each of these paths, as has already been described, a language model can be used for the score.

When a last inserted word of a preliminary word string is erased during optimization of the word graph, either because of an identical word sequence with a more attractive score or because the threshold value is exceeded by this word, it may occur that the end of a preliminary word string at which the last word joined has been erased is not continued with another word, but ends without continuation. Such quasi-open ends of preliminary word strings in principle do not affect the overall recognition process or the resultant output of the words of a word string, but they unnecessarily enlarge the word graph and hence require more effort in storing and outputting the individual word strings. Therefore, a further version of the invention is characterized in that each part of a word string with an end whereto not at least one word has been added and at which the comparison, newly started after this end, is not continued with at least one sequence of reference signals, is erased. Erasure of a non-continued and non-branched preliminary word string is subject to the condition, that the comparison of test signals with beginnings of sequences of reference signals, started immediately after said open end of the word string, is no longer active, i.e. no further comparisons take place in the sequences of reference signals started at the instant directly after the end of the non-continued word string, notably because all sequences started already exceeded the threshold value used for the comparison. This condition is necessary to ensure that a long word which terminates and is output at a later stage does not lose a previously still possible relationship with the past.

For outputting the sequence of words of a word string the word string having the most favourable score is selected, notably when only one sequence is to be output. This can take place at the end of a sentence, but in the event of long sentences it is also possible to start, already before the end of the sentence, the output of that pan of the word sequence whose order and scores have already been fixed relative to all other word sequences. Use can then be made of the score used for the formation of the word graph or, better still, of the further score used, for the comparison with the threshold value in conformity with one of the versions of the method in accordance with the invention. Because a word graph which has been strongly optimized in conformity with the methods described thus far comprises only a comparatively limited number of words which correspond to sides and whose order is fixed, a more complex language model can also be used. Therefore, a further version of the invention is characterized in that, at least at the end of the speech signal, end scores are determined, for all non-erased word strings, from the word scores of the words in each string and from language model scores derived, for coherent parts of the word strings, from a second set of predetermined language model values, the words of at least the word string having the most favourable end score being successively output as from the beginning of this string. For outputting the sequence of words, or for selecting the word string for output with the most favourable score, use is thus made of an score which has been determined while taking into account a complex language model; because of the limited number of words, this is possible with a comparatively small effort. This score determined for output will definitely be distinct from the score used for forming the graph, it also being readily possible for the sequence of the word sequences to change in conformity with the scores. Thus, a higher accuracy can be achieved in determining the actually spoken word sequence.

Despite all optimization efforts, notably in the case of a very large vocabulary it may still occur that the word sequence determined deviates from the actual word sequence, for example due to words which sound similar but which are equivalent according to the language model. For output, for example in the form of a hard copy, therefore, it is generally necessary to perform post-editing. Such post-editing is particularly readily possible when use is made of the word graph obtained by means of the method described thus far. Therefore, a version of the invention is characterized in that during output of the words of a word string as from the beginning, for different words within this word string, one of a plurality of words which succeed the relevant word, which have been joined during formation of the preliminary word strings, and which have not been erased, can be selected the word string output always being continued with the selected word in such a case. This version is based on the recognition of the fact that the actually spoken word is very likely among the recognized words, but is not situated on the optimum path in the word graph due to small pronunciation fluctuations. For example, when the actually spoken and stored speech signal is output again and at the same time the word sequence recognized as being the most probable is word-wise successively displayed on a display screen, output can be interrupted when an incorrectly output word is observed. For this word a list of other words is then displayed in another area of the display screen, which other words emanate from the same point in the word graph as the incorrectly output word. In accordance with a further version of the invention, preferably the selectable words are output in the sequence of the scores producing the word string output thus far, including the selectable words. The operator can then very quickly select the correct one of these words and continue the output. This enables very fast and simple modification of the word sequence output.

Because the continuation can also change when a word is selected other than the word situated on the optimum path in the word graph, because sides emanating from a node in the word graph can continue in a different sequence, in a further version of the invention preferably new end scores are determined after selection of another word, which new end scores emanate at least from the selected word, after which the words of the word string emanating from this selected word and offering the most favourable end score are successively output. Thus, in the event of a modification, the continuation according to this modification is determined anew by means of the language model, so that the probability of output of further incorrect words is thus further reduced.

A device for carrying out the method in accordance with the invention, comprising means for picking up an acoustic signal and for generating a sequence of test signals, means for storing sequences of reference signals corresponding to words, means for comparing the sequences of test signals with the sequences of reference signals, and means for generating word results which comprise scores and reference data in accordance with the invention is characterized in that it comprises means for generating preliminary word strings from the word results, means for storing the preliminary word strings, means for comparing the stored preliminary word strings with one another and for comparing the scores of the stored preliminary word strings with a threshold value and for erasing at least the last words of stored preliminary word strings in dependence on the result of the comparison, and means for outputting the sequence of words of at least one of the preliminary word strings. Thus, the device in accordance with the invention consists essentially of two sections, the first section concerning essentially only the generating of the individual word hypotheses, that is to say separately for successive starting instants and independently from one another. This is realised in known manner by means of the dynamic programming method for searching the best path within the words. The processing steps required for this operation are very time consuming and for acceleration it is known to use threshold value comparisons for the generating of the individual word hypotheses, as well as a preliminary evaluation, notably in the event of a large vocabulary, so that the subsequent test signals are compared with only a small part of the sequences of reference signals. As is also known, the reference signals for the vocabulary can be composed in the form of a tree, i.e. parts of sequences of reference signals are common to several words. However, no language model is taken into account, because in this section only the single word hypotheses per se are generated without coherence with other word hypotheses.

This coherence is provided only in the next section in which preliminary word strings are generated and optimized as already indicated. Even in the case of a large number of word hypotheses, this section requires comparatively little calculation effort, even when the optimization is extensive and comparatively complex. The allocation of all process steps to two essentially mutually independent sections of the overall device in accordance with the invention enables very effective and time saving processing.

Because it may still occur that the word string determined as being the optimum word string by the device in accordance with the invention is not the correct one, preferably interactive post-editing is added. Therefore, an embodiment of the device in accordance with the invention is characterized in that it comprises means for receiving a first control signal and for outputting a plurality of words from word strings in response to the first control signal, and means for receiving a second control signal and for selecting one of the plurality of words output. The control signals are generated by an operator, for example by actuating keys, during display of the recognized word sequence on a display screen. This enables very effective post-editing of the recognized word sequence.

BRIEF DESCRIPTION OF THE DRAWINGS

Embodiments of the invention will be described in detail hereinafter with reference to the drawing. Therein.

DETAILED DESCRIPTION OF THE PREFERRED EMBODIMENT

Figure 1:
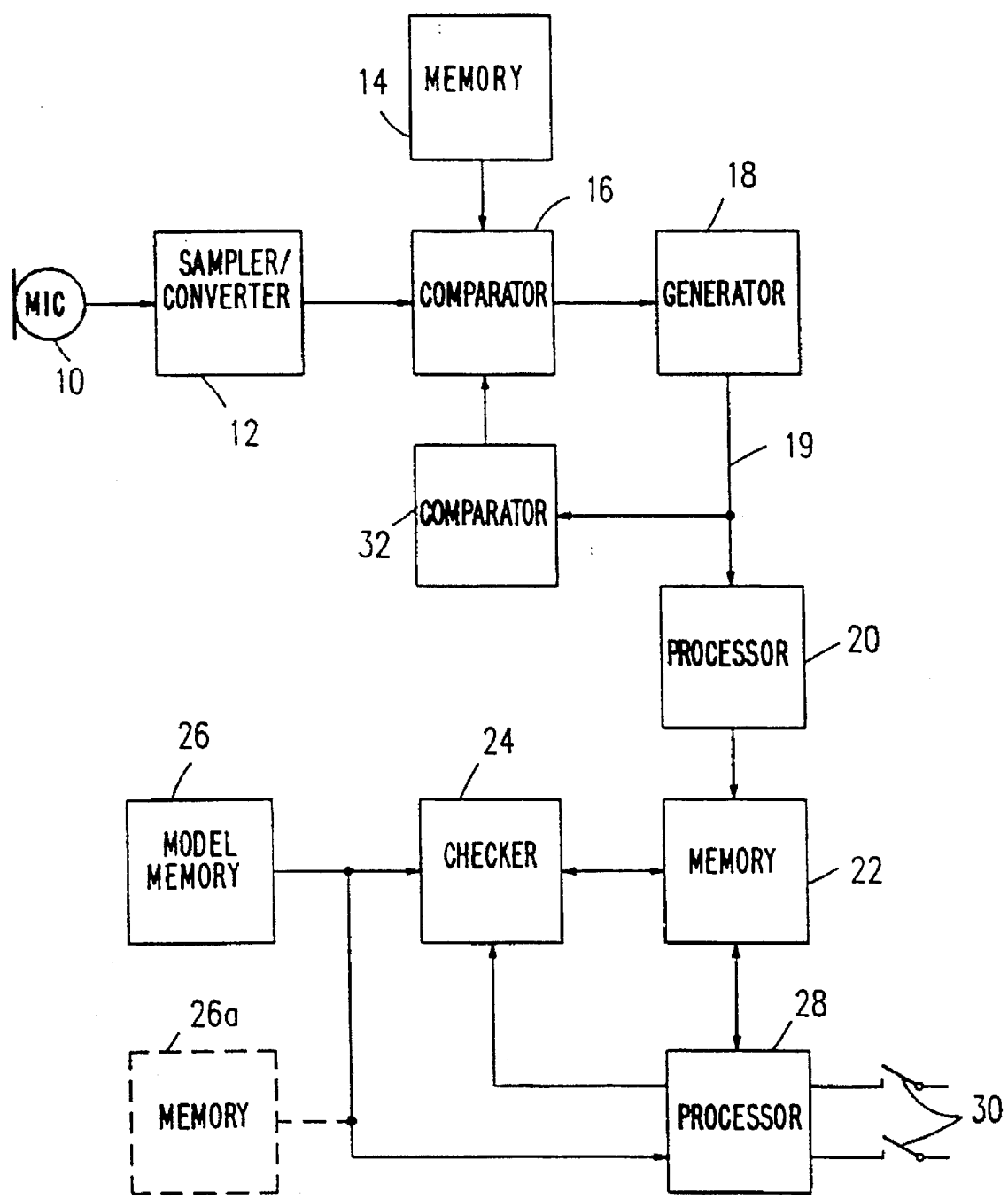
FIG. 1 shows a block diagram of a device in accordance with the invention.

In the device shown in FIG. 1 an acoustic signal is picked up by a microphone 10 so as to be converted into an electric signal which, in the block 12, is sampled preferably at regular instants and converted into a sequence of test signals. Each test signal characterizes a time segment of the speech signal, for example a segment having a duration of 10 ms, via a plurality of parameters, and in block 16 these test signals are compared with reference signals from a memory 14 so as to determine differential values. This comparison is customarily carried out according to the dynamic programming method. The memory 14 contains the reference values as sequences, a sequence corresponding to at least one word of the vocabulary. When the reference signals of the vocabulary are assembled as a tree, parts of the sequences will be common to a plurality of words.

Whenever a word end has been reached, i.e. the last reference signal of a sequence is compared with a test signal, there is output a word result which comprises a word score consisting of accumulated differential values, and also a reference to the ended word which may consist, for example of a number of this word within a vocabulary list, as well as a reference to the beginning and end point of the word, it being possible to express these points, for example as numbers of the test signal at which the sequence of reference signals corresponding to this word has been started and at which this sequence has been terminated, i.e. the number of the actual test signal. The word results generated in block 18 are output via output 19.

The score of the ended word at the output 19 serves as an initial score for a new comparison to be started immediately thereafter in the block 16 for the subsequent test signals with beginnings of sequences of reference signals from the memory 14. The word score is preferably determined from the difference between the initial score and the score at the end of the word. When the ends of several words are simultaneously reached at a test signal, the subsequent comparison is started with an initial score which is the most favourable score of all of said ended words. It is thus achieved that the instantaneous scores of all comparisons, started at different instants or with different test signals, are actually comparable and that, when a threshold value comparison is performed during the generating of the word hypotheses, for all hypotheses a uniform threshold value can be used, which uniform threshold value can be derived from the minimum instantaneous score of all word hypotheses. This is because this minimum score is that of the best path from the beginning of the sentence as far as the instantaneous test signal.

In order to prevent the output of many short words, often included as parts in long words, during each such newly started comparison in the block 32 a correction value is added to the most favourable score of all words, which correction value either represents a fixed value which is the same for all words or is dependent on the unigram probability of the relevant word having shown the most favourable score. Sequences of short words thus very quickly reach unfavourable scores. If, moreover, the comparison in the block 16 takes into account a threshold value which is dependent on the most favourable scores of all comparisons at any instant, such sequences of short words are soon terminated in this manner.

In the case of a large vocabulary, one or more word ends will be reached substantially at each of the successive test signals. It has been found that it is not necessary to start a new comparison with beginnings of sequences of reference values for each word end, but that it suffices to commence a new comparison with beginnings of sequences of reference signals, for example at every third test signal. This reduces the comparison effort without substantially increasing the risk of recognition errors.

The word results appearing at the output 19 are also applied to the block 20 in which preliminary word strings are formed. To this end, for each ended word it is indicated which words directly preceded its beginning and which words have ended simultaneously. Thus, a concatenated data structure of the ended words is formed and stored in the memory 22. Furthermore, the data of the words in the memory 22 for which one or more subsequent words have been terminated is noted. Any preliminary word string can thus be pursued in both directions at any time.

After each new word, with the corresponding data, written into the memory 22 it is checked in block 24 whether a preliminary word string prolonged by the relevant word contains parts which are already present in the same form in another preliminary word string. The same form implies that this part of the two word strings must have started at the same instant and contains the same sequence of words. This can readily occur because, for example a sequence of two or more words can arise with slightly different word boundaries between these individual words. These corresponding word sequences, however, will exhibit different scores because of the different word boundaries. When such word sequences correspond to the beginning and end instant, in the case of separate continuation of these preliminary word strings a less favourable score of a word string can never become more favourable than a more favourable score of another, similar word string. Therefore, in the ease of such corresponding parts of word strings the last words of all word strings with a less favourable score are erased. A further erasure of further words situated in the past, however, is not readily possible; it is possible only if it is ensured that a comparison started after the preceding word is no longer active, because otherwise this preceding word could still be continued with other words, so that it must be retained.

Moreover, for each word newly written into the memory 22, customarily used for the continuation of several preliminary word sags, it is checked whether one of the preliminary word strings thus continued obtains a new score which is less favourable, by a predetermined threshold value, than all scores available at the relevant instant. Because the scores customarily concern the logarithmated probabilities of the individual words so that the scores can be directly added, linear comparison with a threshold value derived from the most favourable score is readily possible.

The scores supplied directly via the lead 19 can be used for the comparison with a threshold value. However, for the word sequences of the individual preliminary word strings on the basis of the concatenated data structure contained in the memory 22 a language model can be used which takes into account the probabilities of sequences of two or more words in order to obtain a further score which is compared with the threshold value. These probabilities of word combinations are stored in a language model memory 26 and have been obtained on the basis of text research. Because the comparison with the threshold value is not very critical when the threshold value is chosen an adequate distance from the best one of the further scores, generally speaking a language model which takes into account only combinations of two words, that is to say a bigram language model, suffices for the comparison with the threshold value.

The further score must then also be stored for each preliminary word string or for the relevant word in the memory 22, in order to be used for calculating the new further score upon the next prolongation of the preliminary word strings.

The sequence of the words of at least one word string will be output no later than at the end of a sentence. To this end, the scores of all words of all word strings still present in the memory 22 are summed; for this purpose use is made again of a language model, that is to say in the simplest case the language model stored in the memory 26 for each time combination of two words. This takes place in the block 28. However, because the number of different word strings is limited, it is also possible to use more complex language models which may be stored in a separate memory 26a, because the time required for taking into account a more complex language model is small in comparison with the time required for the recognition of the individual words in the blocks 16 and 18. The sequence of words of the word string then having the most favourable score is, for example, displayed on a display screen or printed in the block 28.

It is to be noted that, especially in the event of long sentences, output can already commence before that, that is to say as soon as the beginning of preliminary word strings has been unambiguously fixed because none of the word hypotheses started during this initial part of the preliminary word string are still active.

However, because it may be that the word string with the most favourable score does not exactly represent the sequence of the spoken words, it may be useful to output not only the word string with the most favourable score, but a plurality of word strings with an increasingly less favourable score wherefrom the correct sentence can be selected.

Because the word strings have branches to several different words for continuation subsequent to most words within the word string, it is even more attractive to stop the output when an incorrect word is output on the display screen, for example by actuation of one of the keys 30, and to display automatically, in dependence thereon, all other words emanating from the same point of the word string as the last word output, in the form of a menu at a different area of the display screen. Preferably, the speech signal picked up by the microphone 10 is also stored and acoustically reproduced in parallel with the sentence output on the display screen. By actuation of a further key 30 the operator can select one of these additionally displayed words which are effectively displayed as a list in the sequence of their scores. When the output is continued by further actuation of the first key, output will take place as from the end of the selected word; this continuation will often be distinct from the continuation of the incorrectly displayed word. Because the continuation from the end of the selected word also comprises several paths in most cases, preferably before continuation the optimum one of all continuations is selected by means of the language model. Consequently, optimum adaptation to any change occurring, takes place continuously.

Figure 2:
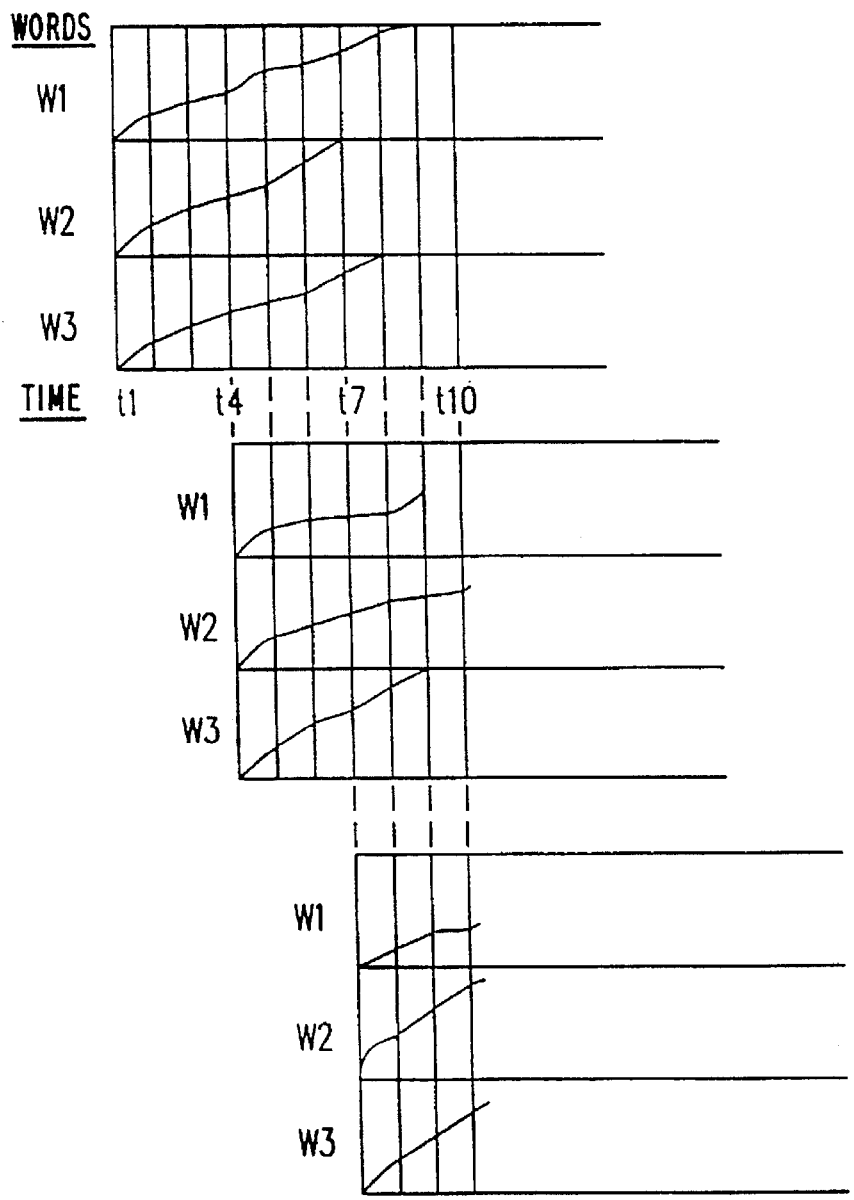
FIG. 2 shows a diagram illustrating the generating of the individual word hypotheses.

The diagram of FIG. 2 shows the execution of the comparisons of test signals with reference signals repeatedly commencing with beginnings of sequences of reference signals. The horizontal axis is the time axis on which the sequence of the test signals is plotted. Each vertical line corresponds to a test signal, only every third test signal thereof being indicated as t1, t4, t7, and t10 for the sake of clarity.

On the vertical axis the sequences of reference signals of the individual words are plotted, that is to say only for three words W1, W2 and W3 by way of example. The individual reference signals within the words are not separately indicated.

The test signal at the instant t1 is then compared with the first reference signals of the three sequences of reference signals, i.e. of the three words, and the next two test signals are compared with the further reference signals at the beginning of the words. When the dynamic programming method is used, paths are thus formed through the rasters of the test signals and reference signals as shown. These paths are continued with the test signal at the instant t4 and the subsequent test signals, and at the same time the test signal at the instant t4 is also compared with the first reference signals of all three words W1 to W3.

At the test signal at the instant t7 on the one hand the word end of the word W2 is reached and, on the other hand a comparison starts again, as shown at the bottom of FIG. 2, with the first reference signals of all three words W1 to W3, whereas other, still active paths are continued.

The comparisons shown at the instants t4 and t7, and the comparisons commencing at a later stage and not shown, are independently executed, i.e. the paths commencing at different instants are separately pursued until the word end, be it that some paths may already have been terminated by comparison with a threshold value; recombination of paths in the same word which have started at different instants will not take place in any event.

At the test signals subsequent to t7 further words are reached, whereas, for example the path in the word W1, started at the instant t4, is interrupted by the comparison of the distance values summed along the path with a threshold value. It is to be noted that when a word end is reached, the scores for this word end are derived from the summed distance values. Summing always commences with an initial score which is derived from the most favourable score of the words ending immediately before the instant t4 or t7. The word score, which indicates the similarity between the relevant speech segment and the compared word, i.e. the compared sequence of reference signals, is then formed by the difference between the scores at the beginning and at the end of the word.

It is to be noted that FIG. 2 is merely a simplified representation of the actual relationships; in reality a plurality of paths extend parallel to one another in the individual words, and in practice the number of words is, of course, very much larger. Given deviations occur also when the reference signals of the individual words of the vocabulary are arranged in the form of a tree; however, comparisons of test signals with different areas of the tree are then also executed in parallel and nodes are continuously reached in the tree in conformity with word ends.

Figure 3:
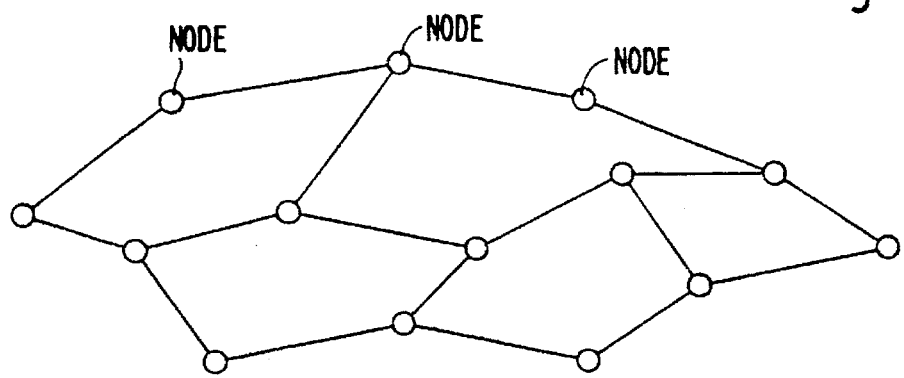
FIG. 3 shows a word graph to illustrate the optimization of the preliminary word strings formed from the word hypotheses.

As is shown in FIG. 2, the word ends are first formed in an independent manner. From these word ends there are formed preliminary word strings which can be represented by means of a word graph. FIG. 3 shows a strongly simplified example of a word graph; this is a directional graph with a beginning node and an end node and whose sides represent words. Each path through the graph, from the beginning node to the end node, represents a feasible sentence. With each node in the graph there is associated an instant, i.e. a test signal, nodes which are situated vertically above one another being assumed to be associated with the same test signal. With each side there are associated a word identity and an score which customarily represents a logarithmated probability of the relevant word having generated the associated segment of the speech signal.

As appears from FIG. 3, some nodes in the graph are branched whereas a plurality of sides join at other nodes. Such nodes then belong to two different feasible paths through the graph.

In practice such a graph, when related to speech recognition with a large vocabulary, of course, is much larger, notably when first all words are used to form preliminary word strings which are produced during the formation of the word hypotheses by the comparison operation of FIG. 2. A preliminary word string is then always a part of the graph from the beginning node to the node corresponding to the instantaneous test signal. Therefore, the graph or the word strings described thereby must be substantially simplified before one word string can be selected from these word strings for output. A word string is obtained in that for each word corresponding to a side in the graph data is stored for all directly preceding words which correspond to the sides in the graph and join each other at the node corresponding to the beginning of this word, and for all subsequent words which correspond to the sides in the graph in which the node continues at the end of the relevant word and also the data for the words which originate from the same node in the graph as the relevant word. As a result, any path through the graph can be followed in both directions and, moreover, at each node all branches can be determined.

Figure 4:
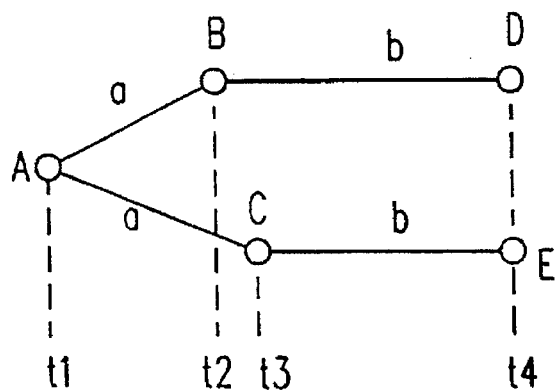
FIG. 4 shows the principle of elimination of parallel parts of word strings.

Various possibilities for simplifying or eliminating word strings so as to optimize a graph will be described with reference to the following Figures. FIG. 4 concerns the case where two parts of different word strings are the same. In the example of FIG. 4 both parts of word strings emanate from the node A at the instant t1, that is to say with the word a. Upon formation of the word hypotheses by comparison of test signals with reference signals, a word is frequently generated with several end points, that is to say with correspondingly different scores, because the transition from one word to the next word usually is not unambiguous in the case of running speech. Consequently, it may occur that a word having started at slightly different instants ends at the same instant, different scores also occurring in that case. In the example shown in FIG. 4, in both parts of the word string the same word sequence a, b occurs, that is to say on the one hand via the node B, the boundary between the two words being assumed to be at an instant t2, and on the other hand via the node C where the boundary between the two words is assumed to be situated at the instant t3. In both cases the word b ends at the node D or E, respectively, at the instant t4, be it with different sums of the scores; this is due to the different boundaries between the two words. Assuming that the sum of the scores at the node E is greater than that at the node D, it will be certain that no continuation from the node E can reach a better score than any continuation from the node D, so that the side from the node C to E, i.e. the relevant word b, is erased. The entire part of the word string from the node A via the node C to the node E cannot yet be erased, because for the time being it is still possible for the node C to continue with another word. It is only after it has been ascertained that the comparisons with all sequences of reference signals started immediately after the node C have been terminated and that the node C cannot be continued with a word, that the word A of the side from the node A to the node C can also be erased. Upon erasure of a word the reference to this word in any preceding word and any simultaneously started word, i.e. any word also emanating from the node C, must be erased.

A further step in simplifying or optimizing the word graph is formed by threshold value comparison. For this purpose reference is made to FIG. 5. From the node A two sides or words a and b emanate at the instant t1 to the node B at the instant t2. From the node B a side e extends to the node E at the instant t5. Furthermore, from the node A the sequence of words c and f emanates, via the node C at the instant t4, to the node F and, moreover, the sequence of words d and g, via the node D, at the instant t3, to the node G, all nodes E, F and G being associated with the same instant t5. Generally speaking, for all word sequences different scores occur at the nodes E, F and G, the more favourable one of the two scores for a and b being used for the path from the node A to the node B. All three scores at the nodes E, F and G are compared with one another and when an score exceeds the most favourable one of these scores by a threshold value, the relevant associated word is erased, for example the word g. The word d cannot be erased as yet for the reasons described with reference to FIG. 4. Erasure can take place only when all words started immediately after the node D have been terminated and it has been ascertained that the node D is continued exclusively by way of the word g. At that instant, generally being after the instant t5, the side or the word d can be erased subject to these conditions.

Similarly, when all words started after the node B have been terminated and the node B is continued, for example only with the word e, it can be checked whether the path via the less attractive one of the two words a and b produces an score which exceeds the threshold at the node E. In this ease the less favourable one of the two words, for example the word b, can also be erased, so that only the word a remains between the nodes A and B.

The sums of the scores of the words can be used directly for the comparison with the threshold value; however, at the word transitions at the nodes B, C and D it is also possible to take into account language model values which depend, for example on the combination of the words a, when this word is the most favourable one, and the word e, or on the combination of the words c and f, or on the combination of the words d and g.

Figure 5:
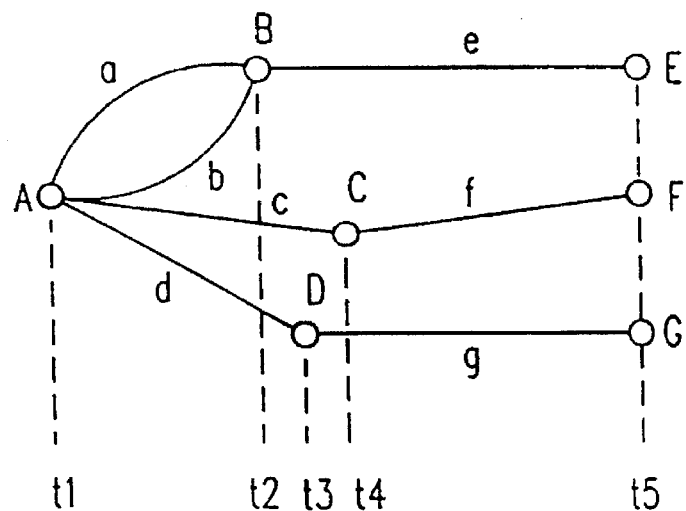
FIG. 5 shows the erasure of parts of word strings by comparison with a threshold value.
Figure 6:
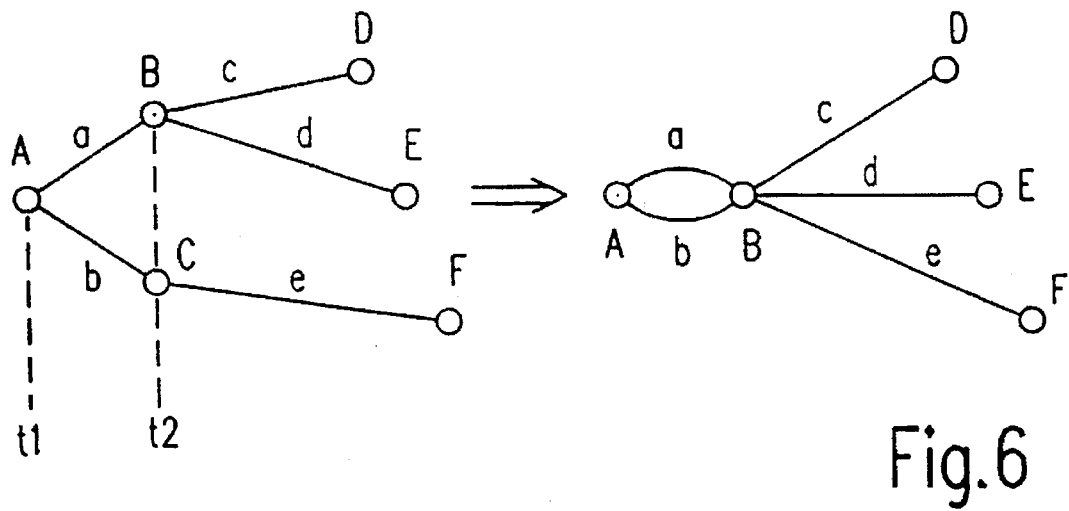
FIG. 6 shows diagrammatically, on the basis of a word graph, the putting together of simultaneous points of different preliminary word strings.

In FIG. 5 it is assumed that the various words e, f and g, all terminating at the instant t5, open into separate nodes E, F and G. Such simultaneous nodes, however, can also be put together, even retroactively, in order to simplify the representation of the graph. In FIG. 6 it is assumed that two words a and b emanate from the node A at the instant t1, the word a extending to the node B where it continues, with the words c and d, to the nodes D and E. The word b extends to the node C at the same instant t2 as the node B, and it continues with the word e to the node F. The nodes B and C are put together and a structure as shown at the right in FIG. 6 is obtained, both words a and b thus extending to the node B and all three words c, d and e continuing from this node. Due to the omission of the node C, a simpler structure of the graph, or the word strings, is obtained, which structure can be more easily represented in the data concatenation.

In principle other steps are also feasible to optimize the word graph or the word strings; for example, instead of forming a minimum number of feasible paths through the graph as in FIG. 6, it may also be effective to minimize the number of nodes or sides in the graph.

From the word strings ultimately obtained, corresponding to the optimized word graph, the word string having the most favourable score is selected; for the various feasible paths through the word graphs an own end score is then determined from the scores of the individual words and taking into account a complex language model, and for the path with the optimum score the words are successively output, starting from the beginning node. The complex language model, therefore, is used only when there is an as small as possible number of words or sides present in or paths present through the graph, because in that case the application of the language model requires very little effort only.

I claim:

1. In a method of determining a sequence of words of a predetermined vocabulary in a speech signal, wherein the method includes the steps of:

sampling the speech signal at recurrent instants so as to produce a sequence of test signals;

comparing the test signals with different sequences of reference signals to generate scores, each sequence of reference signals representing a word of the vocabulary, commencing the comparison anew with successive test signals, starting from the beginning of sequences of reference signals;

deriving, for each word end reached, a word result which comprises a reference to the beginning of the ended word, a word score, and a reference to the ended word;

deriving at least one sequence of words from the word results, carrying out as far as the word end, and independently of any other comparison, each comparison that commences anew with the beginning of sequences of reference signals;

forming a new preliminary word string by joining each word which ends at an instantaneous test signal to each preliminary word string which ends directly before the beginning of that word;

combining the word score of each word with the score reached at the end of the preliminary word string so as to form a new score, most favorable new score being used as an initial score for a comparison newly started immediately thereafter, beginning with the different sequences of reference signals; and successively outputting the words of at least one word string from the beginning.

2. In a method as claimed in claim 1, further comprising checking each new preliminary word string to determine whether at least a part of it is identical, in respect of word order, to a part of another preliminary word string, the compared parts having started and ended at the same test signal.

3. In a method as claimed in claim 1, further comprising erasing all new preliminary word strings whose score is less favorable than the best score of all preliminary word strings preliminarily ending at the instantaneous test signal by more than a predetermined threshold value.

4. In a method as claimed in claim 3, wherein the comparison step includes using the threshold value of a further score which is formed by a combination of the new score and a language model score selected, in conformity with the combination of the relevant ended word and at least the last word of the preliminary word string whereto the relevant ended word is added, from a first set of predetermined language model scores.

5. In a method as claimed in claim 1, the further improvement comprising combining, for each newly started comparison, the most favorable score at the end of the preceding word string with a correction value.

6. In a method as claimed in claim 1, wherein words ending at the same test signal constitute a common end of preliminary word strings, the further improvement comprising joining the ending words arising from the comparison newly started immediately after said common end to said common end.

7. In a method as claimed in claim 6, wherein word strings in which several intermediate words or intermediate word sequences have started at the same test signal and have ended at the same other test signal, and where the comparison newly started after said other test signal is not continued further with at least one sequence of reference signals, for each of these intermediate words or intermediate word sequences at least the word scores up to the word ended last are combined to form an intermediate score, the intermediate word or the intermediate word sequence when the intermediate score exceeds the threshold value.

8. In a method as claimed in claim 1, the further improvement comprising erasing each part of a word string, with an end whereto not at least one word has been added and at which the comparison, newly started after this end, is not continued with at least one sequence of reference signals.

9. In a method as claimed in claim 1, the improvement comprising determining at least at the end of the speech signal, end scores for all non-erased word strings, from the word scores of the words in each string and from language model scores derived, for coherent parts of the word strings, from a second set of predetermined language model values, the words of at least the word string having the most favorable end score being successively output as from the beginning of this string.

10. In a method as claimed in claim 1, wherein in that during output of the words of a word string as from the beginning, for different words within this word string, one of a plurality of words which succeeded the relevant word, which have been joined during formation of the preliminary word strings, and which have not been erased, can be selected the word string output always being continued with the selected word in such a case.

11. In a method as claimed in claim 10, further comprising outputting the selectable words in the sequence of the scores to produce the output word string.

12. In a method as claimed in claim 10, further comprising determining new end scores after selection of another word, which new end scores emanate at least from the selected word, after which the words of the word string emanating from this selected word and offering the most favorable end score are successively output.

13. A device for determining a sequence of words of a predetermined vocabulary in a speech signal said device comprising:

means for picking up an acoustic signal and for generating a sequence of test signals, means for storing sequences of reference signals corresponding to words, means for comparing the sequences of test signals with the sequences of reference signals, means for generating word results which comprise scores and reference data, means for generating preliminary word strings from the word results, means for storing the preliminary word strings, means for comparing the stored preliminary word strings with one another and for comparing the scores of the stored preliminary word strings with a threshold value and for erasing at least the last words of stored preliminary word strings in dependence on the result of the comparison, and means for outputting the sequence of words of at least one of the preliminary word strings.

14. In a device as claimed in claim 13, further comprising means for receiving a first control signal and for outputting a plurality of words from word strings in response to the first control signals, and means for receiving a second control signal and for selecting one of the plurality of words output.

* * * * *